United States Patent
Byun et al.

(10) Patent No.: US 11,428,848 B2
(45) Date of Patent: Aug. 30, 2022

(54) ANTI-REFLECTIVE FILM, POLARIZING PLATE, AND DISPLAY APPARATUS

(71) Applicant: LG CHEM, LTD., Seoul (KR)

(72) Inventors: Jinseok Byun, Daejeon (KR); Jung Hyun Seo, Daejeon (KR); Kwangseok Seo, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 70 days.

(21) Appl. No.: 16/865,006

(22) Filed: May 1, 2020

(65) Prior Publication Data

US 2020/0257022 A1    Aug. 13, 2020

Related U.S. Application Data

(63) Continuation-in-part of application No. PCT/KR2019/000602, filed on Jan. 15, 2019.

(30) Foreign Application Priority Data

Jan. 24, 2018 (KR) .................. 10-2018-0009002

(51) Int. Cl.
*G02B 1/111* (2015.01)
*G02B 1/14* (2015.01)

(52) U.S. Cl.
CPC ............. *G02B 1/111* (2013.01); *G02B 1/14* (2015.01); *Y10T 428/24942* (2015.01)

(58) Field of Classification Search
CPC ............................................. G02B 1/00–1/18
See application file for complete search history.

(56) References Cited

U.S. PATENT DOCUMENTS

| | | |
|---|---|---|
| 9,493,620 B2 | 11/2016 | Okano et al. |
| 2005/0106333 A1 | 5/2005 | Lehmann et al. |
| 2006/0147724 A1 | 7/2006 | Mizuno |
| 2006/0147729 A1 | 7/2006 | Mizuno |
| 2007/0092730 A1 | 4/2007 | Inakura et al. |
| 2007/0268587 A1 | 11/2007 | Ninomiya et al. |
| 2010/0021694 A1 | 1/2010 | Wakizaka et al. |
| 2010/0067109 A1 | 3/2010 | Horio et al. |
| 2011/0318567 A1 | 12/2011 | Hildenbrand et al. |
| 2013/0084442 A1 | 4/2013 | Akutagawa et al. |
| 2013/0090403 A1 | 4/2013 | Jung et al. |
| 2013/0265529 A1 | 10/2013 | Wakizaka et al. |
| 2014/0133033 A1 | 5/2014 | Shim et al. |
| 2016/0187540 A2 | 6/2016 | Akutagawa et al. |
| 2016/0304722 A1 | 10/2016 | Kobori |
| 2017/0123108 A1 | 5/2017 | Kobori et al. |
| 2017/0131439 A1 | 5/2017 | Kobori et al. |
| 2018/0217297 A1 | 8/2018 | Kim et al. |
| 2018/0231688 A1 | 8/2018 | Byun et al. |
| 2018/0231690 A1 | 8/2018 | Byun et al. |
| 2018/0313978 A1 | 11/2018 | Chang et al. |
| 2018/0364396 A1 | 12/2018 | Jang et al. |
| 2019/0011602 A1 | 1/2019 | Kim et al. |

FOREIGN PATENT DOCUMENTS

| | | |
|---|---|---|
| CN | 1955762 A | 5/2007 |
| CN | 102985500 A | 3/2013 |
| CN | 103460079 A | 12/2013 |
| CN | 106662672 A | 5/2017 |
| CN | 106662691 A | 5/2017 |
| CN | 107003562 A | 8/2017 |
| CN | 107360718 A | 11/2017 |
| CN | 107850692 A | 3/2018 |
| CN | 107850693 A | 3/2018 |
| EP | 3163336 A1 | 5/2017 |
| EP | 3299851 A1 | 3/2018 |
| EP | 3316008 A1 | 5/2018 |
| EP | 3733745 A1 | 11/2020 |
| JP | 2007-114699 A | 5/2007 |
| JP | 2008-089969 A | 4/2008 |
| JP | 2008-107792 A | 5/2008 |
| JP | 2008-527076 A | 7/2008 |
| JP | 2009-035594 A | 2/2009 |
| JP | 2009-086360 A | 4/2009 |
| JP | 2010-025996 A | 2/2010 |
| JP | 2012-234170 A | 11/2012 |
| JP | 2013-075285 A | 4/2013 |
| JP | 2013-076786 A | 4/2013 |
| JP | 2014-006447 A | 1/2014 |
| JP | 2014-059368 A | 4/2014 |

(Continued)

OTHER PUBLICATIONS

Machine translation of JP2015225129. Retrieved Dec. 17, 2021.*
Machine translation of JP2014-059368. Retrieved May 25, 2022.*
Search Report & Written Opinion issued for International Application No. PCT/KR2019/000601 dated Apr. 22, 2019, 7 pages.
Search Report & Written Opinion issued for International Application No. PCT/KR2019/000602 dated Apr. 22, 2019, 8 pages.

(Continued)

*Primary Examiner* — Prashant J Khatri

(74) *Attorney, Agent, or Firm* — Rothwell, Figg, Ernst & Manbeck, P.C.

(57) ABSTRACT

An anti-reflective film including: a hard coating layer; and a low refractive index layer containing a binder resin, and two or more kind of hollow inorganic particles having different particle diameters measured by dynamic light scattering (DLS), wherein the two or more kind of hollow inorganic particles having different particle diameters include one kind of hollow inorganic particles having a particle diameter of 40 nm to 60 nm and one kind of hollow inorganic particles having a particle diameter of 65 nm to 100 nm, and a display apparatus comprising the anti-reflective film.

14 Claims, No Drawings

(56) References Cited

FOREIGN PATENT DOCUMENTS

| | | | |
|---|---|---|---|
| JP | 2014-064477 A | 4/2014 | |
| JP | 5771967 B2 | 9/2015 | |
| JP | 2015225129 A * | 12/2015 | ......... G02F 1/13363 |
| JP | 2016-155992 A | 9/2016 | |
| JP | 6011527 B2 | 10/2016 | |
| JP | 2017-016153 A | 1/2017 | |
| JP | 2018-524641 A | 8/2018 | |
| JP | 2018-530007 A | 10/2018 | |
| KR | 10-2006-0031941 A | 4/2006 | |
| KR | 10-0710961 B1 | 4/2007 | |
| KR | 10-2009-0044089 A | 5/2009 | |
| KR | 10-2011-0052656 A | 5/2011 | |
| KR | 10-2012-0007461 A | 1/2012 | |
| KR | 10-2013-0010330 A | 1/2013 | |
| KR | 10-2013-0120223 A | 11/2013 | |
| KR | 10-2014-0006922 A | 1/2014 | |
| KR | 10-2016-0002409 A | 1/2016 | |
| KR | 10-2016-0072329 A | 6/2016 | |
| KR | 10-2017-0031640 A | 3/2017 | |
| KR | 10-2017-0065459 A | 6/2017 | |
| KR | 10-2017-0070278 A | 6/2017 | |
| KR | 10-2017-0082918 A | 7/2017 | |
| KR | 10-2017-0086477 A | 7/2017 | |
| KR | 10-2017-0103685 A | 9/2017 | |
| KR | 10-2017-0106231 A | 9/2017 | |
| KR | 10-2017-0141169 A | 12/2017 | |
| TW | 201213429 A | 4/2012 | |
| TW | 201605955 A | 2/2016 | |
| WO | 2012-147527 A1 | 11/2012 | |
| WO | 2016-084729 A1 | 6/2016 | |
| WO | 2017-043948 A1 | 3/2017 | |
| WO | 2017-078428 A1 | 5/2017 | |
| WO | 2017-095206 A1 | 6/2017 | |
| WO | 2017-155335 A1 | 9/2017 | |
| WO | 2017-155338 A1 | 9/2017 | |

OTHER PUBLICATIONS

Extended European Search Report dated Dec. 14, 2020, of the corresponding European Patent Application No. 19744437.5, 9 pages.

Extended European Search Report issued for corresponding European Patent Application No. 19744347.6 dated Sep. 14, 2020, 9 pages.

* cited by examiner

ANTI-REFLECTIVE FILM, POLARIZING PLATE, AND DISPLAY APPARATUS

CROSS-REFERENCE TO RELATED APPLICATION(S)

This application is a continuation-in-part of PCT/KR2019/000602, filed on Jan. 15, 2019, designating the United States and which claims the benefits of the filing date of Korean Patent Application No. 10-2018-0009002 filed with Korean Intellectual Property Office on Jan. 24, 2018, the entire contents of which are incorporated herein by reference.

FIELD OF THE INVENTION

The present invention relates to an anti-reflective film, a polarizing plate, and a display apparatus.

BACKGROUND OF THE INVENTION

In general, a flat panel display device such as a PDP or a LCD is equipped with an anti-reflective film for minimizing the reflection of light incident from the outside. As methods for minimizing the reflection of light, a method (anti-glare: AG coating) in which a filler such as inorganic fine particles are dispersed in a resin and coated onto a substrate film to impart irregularities, a method (anti-reflection: AR coating) of using the interference of light by forming a plurality of layers having different refractive indexes on a substrate film, a method for mixing them, etc., exist.

Among them, in the case of the AG coating, the absolute amount of the reflected light is equivalent to that of general hard coating, but a low reflection effect can be obtained by reducing the amount of light entering the eye using light scattering through irregularities. However, since the AG coating has poor screen sharpness due to the surface irregularities, many studies on AR coating have been recently conducted.

As for a film using the AR coating, a multi-layer structure in which a hard coating layer (high refractive index layer), a low reflective coating layer, and the like are laminated on a substrate film has been commercialized. However, the film using the conventional AR coating has a disadvantage that the reflectance increases at a portion damaged by rubbing, friction, or the like from the outside. Accordingly, many studies have been conducted to obtain an anti-reflective film that suppresses a rise in the reflectance even if it is damaged due to external influences.

BRIEF SUMMARY OF THE INVENTION

The present invention provides an anti-reflective film that effectively suppresses a rise in reflectance due to external rubbing or friction while having good mechanical properties such as high abrasion resistance and scratch resistance and excellent optical properties.

The present invention also provides a display apparatus including the anti-reflective film and providing high screen sharpness.

The present invention provides an anti-reflective film including: a hard coating layer; and a low refractive index layer containing a binder resin, and two or more hollow inorganic particles having different particle diameters measured by dynamic light scattering (DLS), wherein the two or more hollow inorganic particles having different particle diameters include one kind of hollow inorganic particles having a particle diameter of 40 nm to 60 nm and one kind of hollow inorganic particles having a particle diameter of 65 nm to 100 nm.

The present invention also provides a polarizing plate including the aforementioned anti-reflective film.

In addition, the present invention provides a display apparatus including the aforementioned anti-reflective film.

DETAILED DESCRIPTION OF THE INVENTION

Hereinafter, an anti-reflective film according to a specific embodiment of the present invention and a display apparatus including the same will be described in detail.

In the present specification, (meth)acrylate refers to including both acrylate and methacrylate.

Further, the photocurable resin collectively refers to a polymer resin polymerized by irradiation with light, for example, by irradiation with visible light or ultraviolet light.

In addition, the fluorine-based compound refers to a compound containing at least one fluorine element in the compound.

According to one embodiment of the present invention, an anti-reflective film can be provided, including: a hard coating layer; and a low refractive index layer containing a binder resin, and two or more hollow inorganic particles having different particle diameters measured by dynamic light scattering (DLS), wherein the two or more hollow inorganic particles having different particle diameters include one kind of hollow inorganic particles having a particle diameter of 40 nm to 60 nm and one kind of hollow inorganic particles having a particle diameter of 65 nm to 100 nm.

As a result of research by the present inventors, it has been found through experiments that in the case of the anti-refractive film including two or more kind of hollow inorganic particles having different particle diameters in the binder resin of the low refractive index layer, the hollow inorganic particles having a relatively small particle diameter are arranged between the hollow inorganic particles having a relatively large particle diameter, and the arrangement of the hollow inorganic particles contained in the low refractive index layer is optimized, the physical properties such as abrasion resistance and scratch resistance can be secured while preventing a rise in reflectance due to rubbing or friction from the outside, and furthermore, the anti-refractive film can exhibit excellent mechanical properties while enhancing the sharpness of the screen of the display apparatus, thereby completing the present invention.

Further, the hollow inorganic particles contained in the low refractive index layer are fine particles having a hollow portion therein, and contain air having a refractive index of 1.0 in the hollow portion, and thus it can have a low refractive index of about 1.20 to 1.40. Thus, when these particles are included in the low refractive index layer, the refractive index of the low refractive index layer can be controlled to be low even if the density of the hollow inorganic particles contained in the low refractive index layer is high, and the low reflectance can be accordingly achieved.

Further, the weight ratio between one kind of the hollow inorganic particles having a particle diameter of 40 nm to 60 nm and one kind of the hollow inorganic particles having a particle diameter of 65 nm to 100 nm may be 7:3 to 3:7, 6:4 to 4:6, or 6.5:4.5 to 5:5. If the weight ratio range is not satisfied, the arrangement of the hollow inorganic particles is disturbed, and the coating layer is damaged due to external rubbing or friction, thereby causing a rise in the reflectance.

The characteristics of the anti-reflective film according to one embodiment are in accordance with the characteristics and the like of the low refractive index layer containing one kind of hollow inorganic particles having a particle diameter of 40 nm to 60 nm and one kind of hollow inorganic particles having a particle diameter of 65 nm to 100 nm at a weight ratio of 7:3 to 3:7. The arrangement of the hollow inorganic particles contained in the low refractive index layer becomes ideal and thus stress can be minimized during application of friction, and also, even if rubbing or friction is applied from the outside, it is possible to suppress a rise in the reflectance of the damaged portion.

The two or more kind of hollow inorganic particles having different particle diameters may include one kind of hollow inorganic particles having a particle diameter of 40 nm to 60 nm, 42 to 60 nm, or 45 to 60 nm, and one kind of hollow inorganic particles having a particle diameter of 65 nm to 100 nm, 65 nm to 95 nm, or 65 nm to 90 nm.

When the particle diameter of the one kind of hollow inorganic particles having a particle diameter of 40 nm to 60 nm, 42 to 60 nm, or 45 to 60 nm is less than 40 nm, the refractive index of the low refractive index layer is increased and the reflectance can be increased.

When the particle diameter of the one kind of hollow inorganic particles having a particle diameter of 65 nm to 100 nm, 65 nm to 95 nm, or 65 nm to 90 nm is more than 100 nm, the strength of the low refractive layer becomes weak and the scratch resistance is lowered.

The particle diameter of the hollow inorganic particles can be confirmed through a conventionally known method, and can be confirmed, for example, through dynamic light scattering (DLS), transmission electron microscope (TEM) or the like.

The particle diameter difference between the particle diameter of one kind of the hollow inorganic particles having a particle diameter of 40 nm to 60 nm, and the particle diameter of one kind of the hollow inorganic particles having a particle diameter of 65 nm to 100 nm, may be 5 nm to 60 nm, 7 nm to 40 nm, or 8 nm to 30 nm. If the particle diameter difference is too small or too large, the reflectance of the portion where the low refractive index layer is damaged by external rubbing, friction, or the like can be increased.

The content of the two or more kind of hollow inorganic particles may be 30 to 500 parts by weight, 50 to 450 parts by weight, or 60 to 400 parts by weight based on 100 parts by weight of the binder resin. If the content is less than 30 parts by weight, the reflectance of the low refractive index layer can be increased, and if the content is more than 500 parts by weight, the scratch resistance is lowered due to the lowering of the content of the binder resin, or the reflectance of a portion damaged by external rubbing or friction may increase.

On the other hand, each of the hollow inorganic particles may contain at least one reactive functional group selected from the group consisting of a (meth)acrylate group, an epoxide group, a vinyl group, and a thiol group on the surface. As each of the hollow inorganic particles contains the reactive functional group on the surface, the low refractive index layer may have a higher degree of crosslinking. Consequently, it is possible to effectively suppress a rise in the reflectance of a portion damaged by external rubbing or friction, and the scratch resistance and the anti-fouling property can be further improved.

In addition, the surface of the hollow inorganic particles may be coated with a fluorine-based compound. When the surface of the hollow inorganic particles is coated with a fluorine-based compound, the surface energy can be further lowered, and consequently, the durability and scratch resistance of the low refractive index layer can be improved.

As a method of coating the surface of the hollow inorganic particles with a fluorine compound, conventionally known particle coating methods, polymerization methods, and the like can be used without particular limitation. For example, the hollow inorganic particles and the fluorine-based compound may be subjected to a sol-gel reaction in the presence of water and a catalyst to bind the fluorine-based compound to the surface of the hollow inorganic particles through hydrolysis and condensation.

Specific examples of the hollow inorganic particles include hollow silica particles. The hollow silica may include a predetermined functional group substituted on the surface in order to be more easily dispersed in an organic solvent. Examples of the organic functional group that can be substituted on the surface of the hollow silica particles are not particularly limited, and for example, a (meth)acrylate group, a vinyl group, a hydroxyl group, an amine group, an allyl group, an epoxy group, an isocyanate group, fluorine, or the like may be substituted on the surface of the hollow silica.

The binder resin may include a crosslinked polymer of a photopolymerizable compound; and a fluorine-based compound containing a photoreactive functional group. As the crosslinked polymer is contained in the binder resin of the low refractive index layer, it may have lower reflectance and improved light transmittance, and it is also possible to effectively suppress a rise in the reflectance of a portion damaged by external rubbing, friction, or the like.

The photopolymerizable compound is a compound that causes a polymerization reaction when light is irradiated, for example, when visible light or ultraviolet light is irradiated. The photopolymerizable compound may include a monomer or an oligomer containing a (meth)acrylate or a vinyl group. Specifically, the photopolymerizable compound may include a monomer or an oligomer containing one or more, two or more, or three or more (meth)acrylates or vinyl groups.

Specific examples of the monomer or oligomer containing (meth)acrylate include pentaerythritol tri(meth)acrylate, pentaerythritol tetra(meth)acrylate, dipentaerythritol penta (meth)acrylate, dipentaerythritol hexa(meth)acrylate, tri pentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, an dendritic acrylate oligomer, or a mixture of two or more thereof. In this case, the molecular weight of the oligomers is preferably 1000 to 10,000.

Specific examples of the monomer or oligomer containing a vinyl group may include divinylbenzene, styrene, and para-methyl styrene.

One or more photoreactive functional groups may be contained or substituted in the fluorine-based compound containing a photoreactive functional group. The photoreactive functional group means a functional group capable of participating in the polymerization reaction by irradiation with light, for example, by irradiation with visible light or ultraviolet light. The photoreactive functional group may include various functional groups known to be capable of participating in the polymerization reaction by irradiation with light. Specific examples thereof include a (meth)acrylate group, an epoxide group, a vinyl group, and a thiol group.

The fluorine-based compound containing the photoreactive functional group may contain 0.1 to 50% by weight, 0.3 to 40% by weight, or 0.5 to 30% by weight of fluorine. When the content of fluorine is less than 0.1% by weight, the fluorine component is not sufficiently arranged on the surface of the low refractive index layer, and thus the slip property of the surface can be lowered. When the content of fluorine is more than 50% by weight, the scratch resistance deteriorates and the reflectance of the portion damaged due to external rubbing, friction, or the like can increase.

The fluorine-based compound containing a photoreactive functional group may further contain silicon or a silicon compound. That is, the fluorine-based compound containing a photoreactive functional group can optionally contain silicon or a silicon compound therein. Specifically, the content of silicon in the fluorine-based compound containing a photoreactive functional group may be 0.1% to 20% by weight, 0.5% to 18% by weight, or 1% to 15% by weight. The silicon contained in the fluorine-based compound containing a photoreactive functional group can prevent the generation of haze on the low refractive index layer and serve to enhance transparency. On the other hand, if the content of silicon in the fluorine-based compound containing a photoreactive functional group is too large, the alkali resistance of the low refractive index layer may be lowered.

The fluorine-based compound containing a photoreactive functional group may have a weight average molecular weight (weight average molecular weight in terms of polystyrene measured by the GPC method) of 2000 to 200,000, 3000 to 180,000, or 4000 to 170,000. If the weight average molecular weight of the fluorine-based compound containing a photoreactive functional group is less than 2000, the fluorine component is not sufficiently arranged on the surface of the low refractive index layer, and thus the slip property of the surface can be lowered. Further, if the weight average molecular weight of the fluorine-based compound is more than 200,000, the scratch resistance of the low refractive index layer deteriorates and the reflectance of a portion damaged by external rubbing, friction, or the like can increase. In addition, since the compatibility between the fluorine-based compound containing a photoreactive functional group and the other components is lowered, uniform dispersion is not achieved at the time of preparing the low refractive index layer, and thus the internal structure or surface properties of the final product may be deteriorated.

Specifically, the fluorine-based compound containing the photoreactive functional group includes: i) an aliphatic compound or an aliphatic cyclic compound in which at least one photoreactive functional group is substituted and at least one fluorine is substituted for at least one carbon; ii) a heteroaliphatic compound or heteroaliphatic cyclic compound in which at least one photoreactive functional group is substituted, at least one hydrogen is substituted with fluorine, and at least one carbon is substituted with silicon; iii) a polydialkylsiloxane-based polymer (for example, a polydimethylsiloxane-based polymer) in which at least one photoreactive functional group is substituted and at least one fluorine is substituted for at least one silicon; iv) a polyether compound in which at least one photoreactive functional group is substituted and at least one hydrogen is substituted with fluorine; or a mixture of two or more of i) to iv) or copolymers thereof.

The low refractive index layer may have a refractive index of 1.2 to 1.55, 1.25 to 1.45, or 1.3 to 1.43.

On the other hand, the low refractive index layer can be obtained by coating a photopolymerizable coating composition including: two or more kind of hollow inorganic particles having different particle diameters; a photopolymerizable compound; and a fluorine-based compound containing a photoreactive functional group, onto a predetermined substrate and photo-polymerizing the coated product. The specific type and thickness of the substrate are not particularly limited, and a substrate known to be used in the production of the low refractive index layer or the anti-reflective film can be used without particular limitation.

Meanwhile, a method and apparatus commonly used for coating the photocurable coating composition can be used without particular limitation. For example, a bar coating method, such as one using a Meyer bar or the like, a gravure coating method, a 2-roll reverse coating method, a vacuum slot die coating method, a 2-roll coating method, or the like can be used.

In the step of photo-polymerizing the photocurable coating composition, ultraviolet light or visible light having a wavelength of 200 nm to 400 nm can be irradiated, and the amount of exposure is preferably 100 to 4000 mJ/cm$^2$. The exposure time is not particularly limited, and can be appropriately varied depending on the exposure apparatus used, the wavelength of the irradiated light, or the amount of exposure. Further, in the step of photo-polymerizing the photocurable coating composition, nitrogen purging or the like may be performed to apply nitrogen atmosphere conditions.

The antireflection film may have average reflectance of less than 3%, 2.5% or less, or 2% or less in the wavelength range of 380 nm to 780 nm.

On the other hand, as the hard coating layer, one that is commonly known in the art can be used without particular limitation. One example of the hard coating layer may be one including a binder resin containing a photocurable resin, and organic or inorganic fine particles dispersed in the binder resin.

The aforementioned low refractive index layer may be formed on one side of the hard coating layer, and an additional functional layer may be further included between the low refractive index layer and the hard coating layer.

The photocurable resin is a polymer resin polymerized by irradiation with light, for example, by irradiation with visible light or ultraviolet light as previously described, and examples thereof may include at least one selected from a reactive acrylate oligomer group consisting of a urethane acrylate oligomer, an epoxide acrylate oligomer, a polyester acrylate, and a polyether acrylate; and a polyfunctional acrylate monomer consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylolpropane triacrylate, trimethyl propane ethoxy triacrylate, 1,6-hexanediol diacrylate, propoxylated glycerol triacrylate, tripropylene glycol diacrylate, and ethylene glycol diacrylate.

The particle diameter of the organic or inorganic fine particles is not specifically limited, but for example, the organic fine particles may have a particle diameter of 1 to 10 μm, and the inorganic particles may have a particle diameter of 1 nm to 500 nm, or 1 nm to 300 nm.

In addition, specific examples of the organic or inorganic fine particles contained in the hard coating layer are not limited, but for example, the organic or inorganic fine particles may be organic fine particles composed of an acrylic-based resin, a styrene-based resin, an epoxide resin, and a nylon resin, or inorganic fine particles composed of silicon oxide, titanium dioxide, indium oxide, tin oxide, zirconium oxide, and zinc oxide.

On the other hand, as another example of the hard coating film, a hard coating layer including a binder resin of a photocurable resin and an antistatic agent dispersed in the binder resin may be mentioned.

The antistatic agent may be a quaternary ammonium salt compound, a conductive polymer, or a mixture thereof. Here, the quaternary ammonium salt compound may be a compound having at least one quaternary ammonium salt group in the molecule, and a low-molecule type or a high-molecule type can be used without limitation. Further, as the conductive polymer, a low-molecule type or a high-molecule type can be used without limitation, and the type thereof may be conventionally used in the technical field to which the present invention pertains, and thus the conductive polymer is not particularly limited.

The hard coating layer including a binder resin of the photopolymerizable resin, and an antistatic agent dispersed in the binder resin, may further include at least one compound selected from the group consisting of an alkoxysilane-based oligomer and a metal alkoxide-based oligomer.

The alkoxysilane-based compound may be one that is conventionally used in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyl trimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer. However, since the metal alkoxide-based compound can rapidly react with water, the sol-gel reaction can be performed by a method of diluting the metal alkoxide-based compound in an organic solvent and then slowly dripping water. At this time, considering the reaction efficiency or the like, the molar ratio (based on metal ions) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

On the other hand, the anti-refractive film may further include a substrate bonded to the other surface of the hard coating layer. The substrate may be a transparent film having light transmittance of 90% or more and haze of 1% or less. In addition, the material of the substrate may be triacetylcellulose, a cycloolefin polymer, polyacrylate, polycarbonate, polyethylene terephthalate, and the like. Further, the thickness of the substrate film may be 10 to 300 μm in consideration of productivity and the like, but is not limited thereto.

More specifically, the anti-reflective film may further include a light-transmissive substrate whose retardation (Rth) in the thickness direction of 3000 nm or more, 5000 nm or more, or 5000 nm to 20,000 nm as measured at a wavelength of 400 nm to 800 nm Specific examples of such a light-transmissive substrate include a uniaxially stretched polyethylene terephthalate film and a biaxially stretched polyethylene terephthalate film.

When the anti-reflective film includes a light-transmissive substrate having retardation (Rth) in the thickness direction measured at the wavelength of 3000 nm or more, 5000 nm or more, or 5000 nm to 20,000 nm as measured at the wavelength of 400 nm to 800 nm, a rainbow phenomenon due to interference of the visible rays can be alleviated as compared with the case of using the retardation of 3000 nm or less.

The retardation (Rth) in the thickness direction can be confirmed by a commonly known measurement method and measurement apparatus.

For example, the retardation (Rth) in the thickness direction can be determined using a measuring apparatus manufactured by AXOMETRICS, Inc. under the trade name "AxoScan", and the like.

For example, the retardation (Rth) in the thickness direction can be determined by: inputting a value of a refractive index (589 nm) of the light-transmissive substrate film into the measuring apparatus, then measuring the thickness-direction retardation of the light-transmissive substrate film by using light at a wavelength of 590 nm under conditions of a temperature: 25° C. and humidity: 40%; and converting the measured value of the thickness-direction retardation thus determined (the value is measured according to the automatic measurement (automatic calculation) of the measuring apparatus) into a retardation value per 10 μm of the thickness of the film. In addition, the size of the light-transmissive substrate as the measurement sample is not particularly limited, as long as it is larger than a light measurement unit (diameter: about 1 cm) of a stage of the measuring apparatus. However, the size may be a length: 76 mm, a width: 52 mm, and a thickness: 13 μm.

The value of the "refractive index (589 nm) of the light-transmissive substrate" utilized in the measurement of the thickness-direction retardation (Rth) can be determined by: forming an unstretched film including the same kind of resin film as the light-transmissive substrate for forming the film to be measured for the retardation; and then measuring the unstretched film as a measurement sample (in the case where the film to be measured is an unstretched film, the film can be directly used as the measurement sample) for the refractive index for light at 589 nm in an in-plane direction (the direction perpendicular to the thickness direction) of the measurement sample by using a refractive index-measuring apparatus (manufactured by Atago Co., Ltd. under the trade name "NAR-1T SOLID") as a measuring apparatus under a light source of 589 nm and a temperature condition of 23° C.

According to another embodiment of the present invention, a polarizing plate including the anti-reflective film of one embodiment described above can be provided.

The polarizing plate may include a polarizing film and an anti-reflection film formed on at least one side of the polarizing film.

The material and the production method of the polarizing film are not particularly limited, and conventional materials and production methods known in the art can be used. For example, the polarizing film may be a polyvinyl alcohol polarizing film.

A protective film may be provided between the polarizing film and the anti-reflective film.

Examples of the protective film may include, but are not limited to, a COP (cycloolefin polymer)-based film, an acrylic-based film, a TAC (triacetylcellulose)-based film, a COC (cycloolefin copolymer)-based film, and a PNB (polynorbornene)-based film.

In the protective film, a substrate for forming a single coating layer in the production of the anti-reflective film may be used as it is.

The polarizing film and the anti-reflective film may be laminated by an adhesive such as an aqueous adhesive or a non-aqueous adhesive.

According to another embodiment of the invention, a display apparatus including the aforementioned anti-reflective film can be provided.

A specific example of the display apparatus is not limited, and for example, it may be a liquid crystal display (LCD), a plasma display device, or an organic light emitting diode (OLED) device.

In one example, the display apparatus includes: a pair of polarizing plates facing each other; a thin film transistor, a color filter, and a liquid crystal cell sequentially stacked between the pair of polarizing plates; and a backlight unit.

In the display apparatus, the anti-reflective film may be provided on the outermost surface of an observer side or a backlight side of the display panel.

In the display apparatus including the anti-reflective film, the anti-reflective film may be positioned on one surface of the polarizing plate relatively far from the backlight unit, among the pair of polarizing plates.

The display device may include a display panel, a polarizing film provided on at least one surface of the panel, and an anti-reflective film provided on the opposite surface making contact with the panel of the polarizing film.

Advantageous Effects

According to the present invention, an anti-reflective film that effectively suppresses a rise in reflectance due to external rubbing, friction, or the like while having good mechanical properties such as high abrasion resistance and scratch resistance and excellent optical properties, a polarizing plate including the anti-reflective film, and a display apparatus including the anti-reflective film, can be provided.

DETAILED DESCRIPTION OF THE EMBODIMENTS

Hereinafter, the present invention will be described in more detail by way of examples. However, these examples are given for illustrative purposes only, and the scope of the invention is not intended to be limited to or by these examples.

Preparation Examples 1 to 3: Preparation of Hard Coating Layer

Preparation Examples 1

30 g of pentaerythritol triacrylate, 2.5 g of a high molecular weight copolymer (BEAMSET 371, Arakawa Corporation, Epoxy Acrylate, molecular weight: 40,000), 20 g of methyl ethyl ketone, and 0.5 g of a leveling agent (Tego Wet 270) were uniformly mixed. Then, 2 g of an acrylic-styrene copolymer (volume average particle diameter: 2 μm, manufactured by Sekisui Plastic) with a refractive index of 1.525 as a fine particle was added to the mixture to prepare a hard coating composition.

The hard coating composition thus obtained was coated onto a triacetylcellulose film with a #10 Mayer bar and dried at 90° C. for one minute. The dried product was irradiated with ultraviolet light at 150 mJ/cm$^2$ to prepare a hard coating layer having a thickness of 4 μm.

Preparation Example 2

The hard coating composition of Preparation Example 1 was coated on a PET film having a thickness of 80 μm and retardation of 10,000 nm with a #10 Mayer bar, and dried at 60° C. for one minute. The dried product was irradiated with ultraviolet rays at 150 mJ/cm$^2$ to prepare a hard coating layer having a thickness of 4 μm.

Preparation Example 3

A KYOEISHA salt type of antistatic hard coating solution (solid content: 50 wt %, product name: LJD-1000) was coated on a triacetyl cellulose film with #10 Mayer bar, and dried at 90° C. for one minute. The dried product was irradiated with ultraviolet rays at 150 mJ/cm$^2$ to prepare a hard coating layer having a thickness of about 5 μm.

Examples 1 to 6: Preparation of Anti-Reflective Film

Example 1

Based on 100 parts by weight of pentaerythritol triacrylate (PETA), 35 parts by weight of first hollow silica nanoparticles (DLS measurement diameter: 58.4 nm), 75 parts by weight of second hollow silica nanoparticles (DLS measurement diameter: 67.2 nm), 10 parts by weight of a fluorine-based compound (RS-907, DIC), and 12.1 parts by weight of an initiator (Irgacure 127, Ciba) were diluted in an MIBK (methyl isobutyl ketone) solvent so that the solid content concentration became 2.9 wt % to prepare a photocurable coating composition.

The photocurable coating composition was coated onto the hard coating film of Preparation Example 1 in a thickness of about 110 to 120 nm with #4 Mayer bar, dried, and cured at 60° C. for one minute. At the time of curing, ultraviolet light at 252 mJ/cm$^2$ was irradiated to the dried coating under a nitrogen purge.

Example 2

Based on 100 parts by weight of pentaerythritol triacrylate (PETA), 47 parts by weight of first hollow silica nanoparticles (DLS measurement diameter: 55.1 nm), 75 parts by weight of second hollow silica nanoparticles (DLS measurement diameter: 72.3 nm), 61 parts by weight of solid silica nanoparticles (diameter: about 15 nm), 33 parts by weight of a fluorine-based compound (RS-923, DIC), and 31 parts by weight of an initiator (Irgacure 127, Ciba) were diluted in an MIBK (methyl isobutyl ketone) solvent so that the solid content concentration became 3.3 wt % to prepare a photocurable coating composition.

An anti-reflective film was prepared in the same manner as in Example 1, except that the aforementioned photocurable coating composition was used instead of the photocurable coating composition of Example 1.

Example 3

Based on 100 parts by weight of trimethylolpropane triacrylate (TMPTA), 120.4 parts by weight of first hollow silica nanoparticles (DLS measurement diameter: 49.3 nm), 51.6 parts by weight of second hollow silica nanoparticles (DLS measurement diameter: 83.3 nm), 147 parts by weight of solid silica nanoparticles (diameter: about 18 nm), 12 parts by weight of a fluorine-based compound (RS-907, DIC), and 13.5 parts by weight of an initiator (Irgacure 127, Ciba) were diluted in an MIBK (methyl isobutyl ketone) solvent so that the solid content concentration became 2.7 wt % to prepare a photocurable coating composition.

An anti-reflective film was prepared in the same manner as in Example 1, except that the aforementioned photocurable coating composition was used instead of the photocurable coating composition of Example 1.

Example 4

Based on 100 parts by weight of trimethylolpropane triacrylate (TMPTA), 56.8 parts by weight of first hollow silica nanoparticles (DLS measurement diameter: 43.5 nm), 85.2 parts by weight of second hollow silica nanoparticles (DLS measurement diameter: 85.8 nm), 109 parts by weight of solid silica nanoparticles (diameter: about 13 nm), 11.2 parts by weight of a fluorine-based compound (RS-907, DIC), and 9.4 parts by weight of an initiator (Irgacure 127, Ciba) were diluted in an MIBK (methyl isobutyl ketone) solvent so that the solid content concentration became 3.1 wt % to prepare a photocurable coating composition.

The photocurable coating composition was coated onto the hard coating film of Preparation Example 2 in a thickness of about 110 to 120 nm with #4 Mayer bar, dried, and cured at 60° C. for one minute. At the time of curing, ultraviolet light at 252 mJ/cm$^2$ was irradiated to the dried coating under a nitrogen purge.

Example 5

Based on 100 parts by weight of pentaerythritol triacrylate (PETA), 110.7 parts by weight of first hollow silica nanoparticles (DLS measurement diameter: 51.1 nm), 258.3 parts by weight of second hollow silica nanoparticles (DLS measurement diameter: 91.1 nm), 67 parts by weight of solid silica nanoparticles (diameter: about 12 nm), 120 parts by weight of a fluorine-based compound (RS-923, DIC), and 33 parts by weight of an initiator (Irgacure 127, Ciba) were diluted in an MIBK (methyl isobutyl ketone) solvent so that the solid content concentration became 2.8 wt % to prepare a photocurable coating composition.

An anti-reflective film was prepared in the same manner as in Example 4, except that the aforementioned photocurable coating composition was used instead of the photocurable coating composition of Example 4.

Example 6

Based on 100 parts by weight of trimethylolpropane triacrylate (TMPTA), 112.2 parts by weight of first hollow silica nanoparticles (DLS measurement diameter: 55.7 nm), 74.8 parts by weight of second hollow silica nanoparticles (DLS measurement diameter: 86.1 nm), 53 parts by weight of solid silica nanoparticles (diameter: about 18 nm, C784), 75 parts by weight of a fluorine-based compound (RS-907, DIC), and 16.9 parts by weight of an initiator (Irgacure 127, Ciba) were diluted in an MIBK (methyl isobutyl ketone) solvent so that the solid content concentration became 3.0 wt % to prepare a photocurable coating composition.

An anti-reflective film was prepared in the same manner as in Example 4, except that the aforementioned photocurable coating composition was used instead of the photocurable coating composition of Example 4.

Comparative Examples 1 to 5: Preparation of Anti-Reflective Film

Comparative Example 1

An anti-reflective film was prepared in the same manner as in Example 1, except that only 110 parts by weight of hollow silica nanoparticles having a DLS measuring diameter of 67.2 nm were used instead of the first and second hollow silica nanoparticles.

Comparative Example 2

Based on 100 parts by weight of pentaerythritol triacrylate (PETA), 12.2 parts by weight of first hollow silica nanoparticles (DLS measurement diameter: 55.1 nm), 109.8 parts by weight of second hollow silica nanoparticles (DLS measurement diameter: 72.3 nm), 61 parts by weight of solid silica nanoparticles (diameter: about 15 nm), 33 parts by weight of a fluorine-based compound (RS-923, DIC), and 31 parts by weight of an initiator (Irgacure 127, Ciba) were diluted in an MIBK (methyl isobutyl ketone) solvent so that the solid content concentration became 3.3 wt % to prepare a photocurable coating composition.

The photocurable coating composition was coated onto the hard coating film of Preparation Example 1 in a thickness of about 110 to 120 nm with #4 Mayer bar, dried, and cured at 60° C. for one minute. At the time of curing, ultraviolet light at 252 mJ/cm$^2$ was irradiated to the dried coating under a nitrogen purge.

Comparative Example 3

Based on 100 parts by weight of trimethylolpropane triacrylate (TMPTA), 137.6 parts by weight of first hollow silica nanoparticles (DLS measurement diameter: 49.3 nm), 34.4 parts by weight of second hollow silica nanoparticles (DLS measurement diameter: 83.3 nm), 147 parts by weight of solid silica nanoparticles (diameter: about 18 nm), 12 parts by weight of a fluorine-based compound (RS-907, DIC), and 13.5 parts by weight of an initiator (Irgacure 127, Ciba) were diluted in an MIBK (methyl isobutyl ketone) solvent so that the solid content concentration became 2.7 wt % to prepare a photocurable coating composition.

An anti-reflective film was prepared in the same manner as in Comparative Example 2, except that the aforementioned photocurable coating composition was used instead of the photocurable coating composition of Comparative Example 2.

Comparative Example 4

An anti-reflective film was prepared in the same manner as in Example 4, except that only 142 parts by weight of hollow silica nanoparticles having a DLS measuring diameter of 58.4 nm were used instead of the first and second hollow silica nanoparticles.

Comparative Example 5

An anti-reflective film was prepared in the same manner as in Example 4, except that only 142 parts by weight of hollow silica nanoparticles having a DLS measuring diameter of 83.3 nm were used instead of the first and second hollow silica nanoparticles.

Evaluation 1-1. Measurement of Hollow Silica Using Dynamic Light Scattering Method The hollow silica particles were diluted to be a concentration of 0.1 wt % in MIBK, and then the particle diameter was measured using ELSZ-2000 equipment from Otsuka Electronics under the following conditions. In the dilute condition, dilute solvent was set to MIBK.

| Measurement conditions | |
|---|---|
| Upper dust limit (%): 100 | Dust Limit: 10 |
| Optimum Intensity: 80,000 | Maximum Intensity: 100,000 |
| Minimum Intensity: 3000 | Pinhole (μm): 50 |

1-2. Measurement of Diameter of Hollow Silica Particles Using Transmission Electron Microscope (TEM)

Diameter of hollow silica particles in the final film was measured by using Transmission Electron Microscopy (TEM) in the magnitude of 100,000. The anti-reflective film was embedded into the epoxy resin, and sliced with an ultramicrotome (thickness of 150 nm). After transferred onto a Cu grid, five images of hollow silica particles were captured. The diameter of each hollow silica particles of five images was measured and the average value can be calculated.

2. Measurement of Reflectance Rise by Rubbing

The surface of the anti-reflective film was rubbed with Briwax steel wool (#0000) under a load of 500 g and reciprocating 10 times at a rate of 27 rpm. The reflectance rise rate (change amount) was confirmed through the average reflectance measurement before and after the rubbing test. The reflectance was measured as follows. After the rubbing test of the antireflection film obtained in the above examples and comparative examples, the back side of the film was subjected to a dark color treatment, and then the reflectance mode of SolidSpec 3700 (SHIMADZU) equipment was used to measure the average reflectance in a wavelength range of 380 nm to 780 nm. The average reflectance before the rubbing test was also measured for the measurement of the change amount. The results are shown in Table 1 below.

3. Measurement of Scratch Resistance

The surface of the anti-reflective film was rubbed with a load applied steel wool (#0000) and reciprocating 10 times at a rate of 27 rpm. A maximum load at which the number of scratches (of 1 cm or less) observed by the naked eye was 1 or less was measured. The results are shown in Table 1 below.

4. Measurement of Anti-Fouling Property

An anti-fouling property was measured by drawing a straight line having a length of 5 cm on surfaces of the anti-reflective films obtained in the examples and comparative examples using a black oily pen and confirming the number of scrubbing actions required for erasing the straight line at the time of scrubbing the anti-reflective film with a wiper. The results are shown in Table 1 below.

<Measurement Standard>

○: The number of rubbing actions required for erasing the straight line was 10 or less.

Δ: The number of rubbing actions required for erasing the straight line was 11 to 20

X: The number of rubbing actions required for erasing the straight line was more than 20.

TABLE 1

| | Average reflectance before rubbing test (%) | Average reflectance after rubbing test (%) | Average reflectance rise rate (%) | Scratch resistance (g) | Anti-fouling property |
|---|---|---|---|---|---|
| Example 1 | 1.58 | 1.6 | 0.02 | 300 | ○ |
| Example 2 | 1.4 | 1.43 | 0.03 | 500 | ○ |
| Example 3 | 1.33 | 1.35 | 0.02 | 500 | ○ |
| Example 4 | 1.49 | 1.52 | 0.03 | 500 | ○ |
| Example 5 | 0.69 | 0.71 | 0.02 | 500 | ○ |
| Example 6 | 0.89 | 0.9 | 0.01 | 500 | ○ |
| Comparative Example 1 | 1.55 | 1.78 | 0.23 | 200 | ○ |
| Comparative Example 2 | 1.57 | 1.8 | 0.23 | 500 | ○ |
| Comparative Example 3 | 1.6 | 1.92 | 0.32 | 500 | ○ |
| Comparative Example 4 | 1.51 | 1.79 | 0.28 | 500 | ○ |
| Comparative Example 5 | 1.5 | 1.71 | 0.21 | 400 | ○ |

According to Table 1, it was confirmed that the anti-reflective films of Examples 1 to 6 were excellent in the effect of suppressing the rise in the reflectance due to rubbing, as compared with the anti-reflective films of Comparative Examples 1 to 5.

What is claimed is:

1. An anti-reflective film comprising: a hard coating layer; and
a low refractive index layer containing a binder resin, and two or more groups of hollow inorganic particles having different particle diameters measured by dynamic light scattering (DLS),
wherein the two or more groups of hollow inorganic particles having different particle diameters include a first group of hollow inorganic particles having a particle diameter of 40 nm to 60 nm and a second group of hollow inorganic particles having a particle diameter of 65 nm to 100 nm, and
wherein a weight ratio between the first group of the hollow inorganic particles having a particle diameter of 40 nm to 60 nm and the second group of the hollow inorganic particles having a particle diameter of 65 nm to 100 nm is 7:3 to 3:7.

2. The anti-reflective film of claim 1, wherein a particle diameter difference between the particle diameter of the first group of the hollow inorganic particles having a particle diameter of 40 nm to 60 nm and the particle diameter of the second group of the hollow inorganic particles having a particle diameter of 65 nm to 100 nm is 5 nm to 60 nm.

3. The anti-reflective film of claim 1, wherein the low refractive index layer comprises the two or more groups of the hollow inorganic particles having different particle diameters in an amount of 30 to 500 parts by weight based on 100 parts by weight of the binder resin.

4. The anti-reflective film of claim 1, wherein the binder resin includes a crosslinked polymer of a photopolymerizable compound; and a fluorine-based compound containing a photoreactive functional group.

5. The anti-reflective film of claim 1, wherein the low refractive index layer has a refractive index of 1.2 to 1.55.

6. The anti-reflective film of claim 1, wherein the hard coating layer includes a binder resin containing a photocurable resin; and organic or inorganic fine particles dispersed in the binder resin.

7. The anti-reflective film of claim 1, wherein the anti-reflective film has an average reflectance of less than 3% in a wavelength region of 380 nm to 780 nm.

8. The anti-reflective film of claim 1, further comprising a light-transmissive substrate having retardation (Rth) in a thickness direction of at least 3000 nm as measured at a wavelength of 400 nm to 800 nm.

9. A polarizing plate comprising the anti-reflective film of claim 1.

10. A display apparatus comprising the anti-reflective film of claim 1.

11. The anti-reflective film of claim 1, wherein the two or more groups of the hollow inorganic particles include at least one reactive functional group on a surface thereof, the reactive functional group being at least one group selected from a (meth)acrylate group, an epoxide group, a vinyl group, and a thiol group.

12. The anti-reflective film of claim 1, wherein the two or more groups of the hollow inorganic particles include a fluorine-based compound.

13. The anti-reflective film of claim 1, wherein the two or more groups of the hollow inorganic particles include hollow silica particles.

14. A method of preparing the anti-reflective film of claim 1, comprising
providing a hard coating layer,
coating on the hard coating layer a photopolymerizable coating composition including two or more groups of hollow inorganic particles having different particle diameters, and
photo-polymerizing the coated hard coating layer,
wherein the two or more groups of hollow inorganic particles having different particle diameters include a first group of hollow inorganic particles having a particle diameter of 40 nm to 60 nm and a second group of hollow inorganic particles having a particle diameter of 65 nm to 100 nm.

* * * * *